(No Model.)
N. O. BARTLEY.
SPRINKLING APPARATUS.
No. 311,560. Patented Feb. 3, 1885.
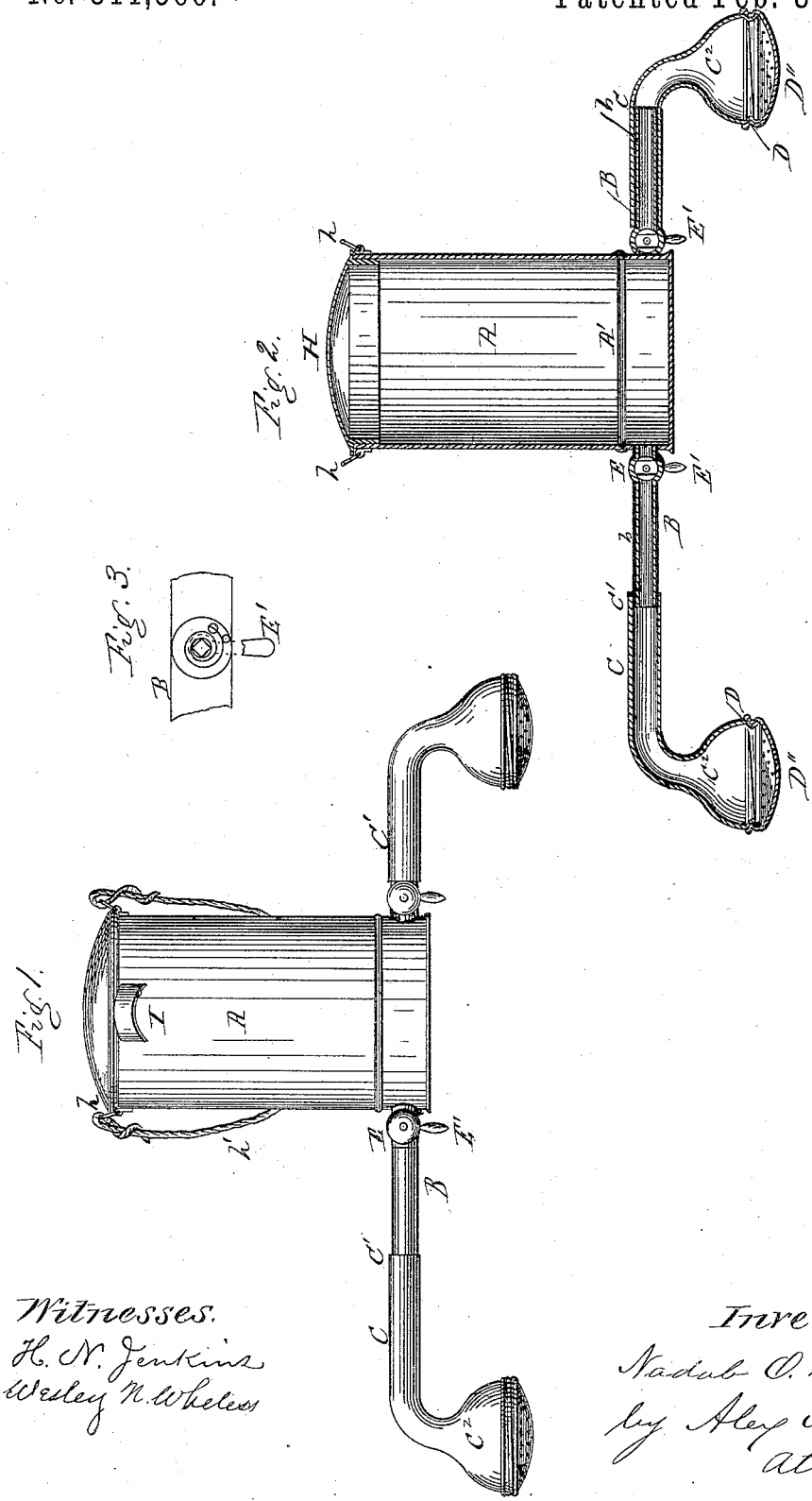
Witnesses.
H. N. Jenkins
Wesley N. Wheless
Inventor.
Nadab O. Bartley
by Alex Mahon
Attorney

UNITED STATES PATENT OFFICE.

NADAB O. BARTLEY, OF AUBURN, NEW YORK.

SPRINKLING APPARATUS.

SPECIFICATION forming part of Letters Patent No. 311,560, dated February 3, 1885.

Application filed May 10, 1884. (No model.)

*To all whom it may concern:*

Be it known that I, NADAB O. BARTLEY, a subject of the Queen of Great Britain, now residing at Auburn, county of Cayuga, State of New York, have invented certain new and useful Improvements in Sprinkling Apparatus, of which the following is a full and exact description, reference being had to the accompanying drawings, making part of specification, in which—

Figure 1 is a front view of the improved apparatus. Fig. 2 is a vertical section of the same; and Fig. 3 is a side view of the cock or faucet, and the spring for closing the same.

My invention relates to that class of apparatus used for sprinkling or distributing liquids upon plants, and is particularly designed for distributing poisonous liquids thereon for destroying potato and other bugs; and the invention consists in certain details in the construction and arrangement of parts hereinafter described.

In the accompanying drawings, A represents a cylindrical can or case provided with a suitable bottom, A', arranged at any desired point in the same. The case or cylinder is provided with suitable outlet-pipes, B B, one upon each side thereof and extending out therefrom, and being covered with a rubber or other flexible covering, $b$ $b$, hereinafter referred to.

C C are pipes, made in elbow form, one end, C', being of such size as to fit upon the outlet-pipe B, as shown, the other end, $C^2$, being expanded or enlarged into cup form. The rim or edge of this portion C' is provided with a screw-thread, D, for permitting a suitable sprinkler or rose-plate, D'', provided with a corresponding screw-thread, to be connected thereto. By extending the outlet-pipes B out from the case and providing them with the flexible covering, as shown and described, it will be seen that the points of discharge may be brought closer together or extended, for adapting the apparatus to be used on plants or rows of plants varying in widths apart, and that the flexible covering will insure a tight joint at the point of connection between the two pipes, and prevent any leakage at that point. It will also be seen that extension-pipes of different lengths may be applied thereto, and, by providing the detachable pipe with the screw-threaded end, that different forms of discharge-outlets or rose-plates with larger or smaller holes, may be readily applied thereto as occasion shall require.

E E represent cocks or faucets, placed one upon each side of the case in the two branches, at the bottom of the reservoir, and are provided with suitable handles, E' E', by which the operator can open the outlet when desired, the cocks or faucets being made to close by means of a suitable spring or similar device, such as is ordinarily used in self-closing cocks or faucets.

H is a cover made in any preferred form. The case or can near its upper edge and upon both sides is provided with suitable rings, $h$ $h$, through which to connect a strap or rope, $h'$, and by means of which strap or rope the apparatus is suspended from the neck of the operator. A handle, I, is secured to the front of the case for permitting the apparatus to be raised or lowered by the operator in passing along the plants, according to the varying heights of the plants.

In operating the device, the strap being placed around the neck of the operator, he grasps the stems, near the valves, with his hands, so as to be able to operate the valve easily in passing along the rows of plants, and at the same time aid in supporting the reservoir and relieve the weight upon his neck.

The device is provided with two sets of discharge-pipes, one long and the other short, to further provide for the varying widths of plants.

Having now described my invention, I claim—

1. The combination, with the reservoir or can having the fixed outlet-pipes upon each side thereof, of the extension-pipes connected therewith, substantially as described, whereby the pipes can be extended upon either or both sides of the can, as and for the purpose set forth.

2. The combination, with the reservoir or can provided with the outlet-pipes upon each side thereof, of the extension-pipes provided with the sprinklers or rose-plates and the self-closing cocks or faucets arranged in the
5 fixed portion of the pipes, substantially as and for the purpose set forth.

3. The can or reservoir having the handle secured to the front portion thereof, in combination with the strap for suspending the can from the neck of the operator, substantially 10 as and for the purpose set forth.

NADAB O. BARTLEY.

Witnesses:
FRANK R. RATHBUN,
S. U. MOSHER.